United States Patent

Thielen

(10) Patent No.: US 7,605,202 B2
(45) Date of Patent: Oct. 20, 2009

(54) TIRE WITH SILICA TREAD HAVING SELF CONDENSING RESIN

(75) Inventor: Georges Marcel Victor Thielen, Schouweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/258,816

(22) Filed: Oct. 27, 2008

(65) Prior Publication Data

US 2009/0137714 A1 May 28, 2009

Related U.S. Application Data

(60) Provisional application No. 60/990,321, filed on Nov. 27, 2007.

(51) Int. Cl.
*B60C 1/00* (2006.01)
(52) U.S. Cl. .................................................. 524/262
(58) Field of Classification Search .................. 524/262
See application file for complete search history.

(56) References Cited

U.S. PATENT DOCUMENTS

| | | | | |
|---|---|---|---|---|
| 3,638,702 | A | 2/1972 | Endter | 152/330 |
| 5,792,805 | A | 8/1998 | Williams | 524/100 |
| 5,891,938 | A | 4/1999 | Williams | 524/100 |
| 5,962,562 | A * | 10/1999 | Wideman et al. | 524/222 |
| 6,274,655 | B1 | 8/2001 | Wideman et al. | 524/188 |
| 7,199,175 | B2 | 4/2007 | Vasseur | 524/492 |
| 2002/0148545 | A1 | 10/2002 | Nanni et al. | 152/450 |
| 2002/0177641 | A1 | 11/2002 | Ezawa et al. | 524/191 |

FOREIGN PATENT DOCUMENTS

| | | |
|---|---|---|
| EP | 1685980 A1 | 1/2006 |
| JP | 2000-313772 | 11/2000 |
| WO | WO 00/61673 | 10/2000 |

OTHER PUBLICATIONS

European Search Report completed Mar. 31, 2009.

* cited by examiner

*Primary Examiner*—Ling-Siu Choi
*Assistant Examiner*—Hui Chin
(74) *Attorney, Agent, or Firm*—John D. DeLong

(57) ABSTRACT

The present invention is directed to a pneumatic tire comprising a ground contacting tread, the ground contacting tread comprising a rubber composition, the rubber composition comprising a diene based elastomer, from 60 to 120 parts by weight, per 100 parts by weight of elastomer (phr) of silica, from 1 to 10 phr of a sulfur-containing organosilicon compound, and from 1 to 5 phr of a self condensing resin derived from monomers of formula I

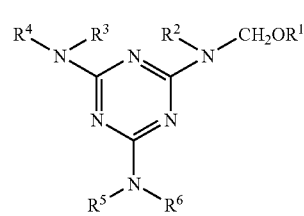

wherein $R^1$ is an alkyl group having 1 to 12 carbon atoms, and each of $R^2$ to $R^6$ is independently selected from the group consisting of hydrogen, —$CH_2OH$, and —$CH_2OR^1$ wherein $R^1$ is as previously described; provided that at least one of $R^2$ to $R^6$ is hydrogen, and at least one of $R^2$ to $R^6$ is —$CH_2OH$.

5 Claims, No Drawings

TIRE WITH SILICA TREAD HAVING SELF CONDENSING RESIN

CROSS REFERENCE TO OTHER APPLICATIONS

This application claims the benefit of Ser. No. 60/990,321 filed Nov. 27, 2007.

BACKGROUND OF THE INVENTION

Ground contacting treads of pneumatic tires are often reinforced with silica to improve rolling resistance and improve wet braking performance as compared to carbon black reinforced treads. To improve the dispersion and interaction of the silica with tread rubber, silane coupling agents are used. However, silane/silica treads are typically inferior in dynamic stiffness as compared with carbon black reinforced treads, leading to inferior performance in certain areas, such as handling and cornering. There is, therefore, a need for improved performance of ground contacting treads containing silica and silane reinforcement.

SUMMARY OF THE INVENTION

The present invention is directed to a pneumatic tire comprising a ground contacting tread, the ground contacting tread comprising a rubber composition, the rubber composition comprising a diene based elastomer, from 60 to 120 parts by weight, per 100 parts by weight of elastomer (phr) of silica, from 1 to 10 phr of a sulfur-containing organosilicon compound, and from 1 to 5 phr of a self condensing resin derived from monomers of formula I

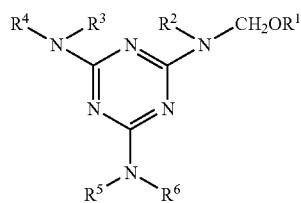

wherein $R^1$ is an alkyl group having 1 to 12 carbon atoms, and each of $R^2$ to $R^6$ is independently selected from the group consisting of hydrogen, —$CH_2OH$, and —$CH_2OR^1$ wherein $R^1$ is as previously described; provided that at least one of $R^2$ to $R^6$ is hydrogen, and at least one of $R^2$ to $R^6$ is —$CH_2OH$.

DETAILED DESCRIPTION OF THE INVENTION

There is disclosed a pneumatic tire comprising a ground contacting tread, the ground contacting tread comprising a rubber composition, the rubber composition comprising a diene based elastomer, from 60 to 120 parts by weight, per 100 parts by weight of elastomer (phr) of silica, from 1 to 10 phr of a sulfur-containing organosilicon compound, and from 1 to 5 phr of a self condensing resin derived from monomers of formula I

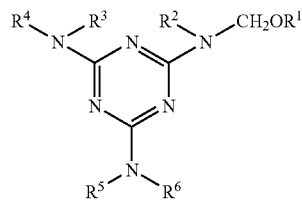

wherein $R^1$ is an alkyl group having 1 to 12 carbon atoms, and each of $R^2$ to $R^6$ is independently selected from the group consisting of hydrogen, —$CH_2OH$, and —$CH_2OR^1$ wherein $R^1$ is as previously described; provided that at least one of $R^2$ to $R^6$ is hydrogen, and at least one of $R^2$ to $R^6$ is —$CH_2OH$. The self-condensing resin can also be an oligomer of monomers of Formula I or a mixture of the monomers and the oligomers thereof. Oligomers of this invention include dimers, trimers, tetramers and the like of the compound of Formula I. Generally, such oligomers are joined by a methylene radical or the radical —$CH_2OCH_2$— with at least one R group of the oligomer being hydrogen.

In one embodiment, $R^1$ is methyl.

In one embodiment, at least one of the combinations ($R^3$ and $R^4$) or ($R^5$ and $R^6$) are both hydrogen.

In one embodiment, the self-condensing resin is a resin having 3.8 units of combined formaldehyde and 2.8 units of methyl groups per unit of melamine ($MF_{3.8}Me_{2.8}$), 34 molar % NH, 56 molar % methylation, 10 molar % methylol and a degree of polymerization of 1.8;

In one embodiment, the self-condensing resin is a resin having 3.8 units of combined formaldehyde, 1.7 units of methyl groups and 1.6 units of n-butyl groups per unit of melamine ($MF_{3.8}Me_{1.7}Bu_{1.6}$), 31 molar % NH, 34 molar % methoxy, 32 molar % n-butoxy; 3 molar % methylol and a degree of polymerization of 2.3.

In one embodiment, the self-condensing resin is a resin having 4.0 units of combined formaldehyde and 2.8 units of methyl groups per unit of melamine ($MF_{4.0}Me_{2.8}$), 30 molar % NH, 58 molar % methylation, 12 molar % methylol and a degree of polymerization of 2.3.

In one embodiment, the self-condensing resin is a resin having 4.4 units of combined formaldehyde and 3.3 units of methyl groups per unit of melamine ($MF_{4.4}Me_{2.8}$), 22 molar % NH, 66 molar % methylation, 18 molar % methylol and a degree of polymerization of 1.75.

In one embodiment, the self-condensing resin is a resin having 4.1 units of combined formaldehyde and 2.7 units of n-butyl groups per unit of melamine ($MF_{4.1}Bu_{2.7}$), 26 molar % NH, 58 molar % butylation, 16 molar % methyol and a degree of polymerization of 2.7.

In one embodiment, the self-condensing resin is a resin having 4.9 units of combined formaldehyde and 2.4 units of methyl groups per unit of melamine ($MF_{4.9}Me_{2.4}$), 12 molar % NH, 48 molar % methyl, 40 molar % methylol and a degree of polymerization of 2.0.

In one embodiment, the self-condensing resin is a resin having 5.3 units of combined formaldehyde and 3.3 units of methyl groups per unit of melamine ($MF_{5.3}Me_{3.3}$), 4 molar % NH, 66 molar % methylation, 30 molar % methylol and a degree of polymerization of 2.5.

In one embodiment, the self-condensing resin is a partially methylated melamine-formaldehyde resin having 3.6 units of combined formaldehyde and 2.0 units of methyl groups per unit of melamine ($MF_{3.6}Me_{2.0}$), 38 molar % NH, 40 molar % methyl, 22 molar % methylol and a degree of polymerization of 1.8.

Suitable self condensing resins are available commercially for examples as Cyrez CRA-132S from Cytec Industries, Inc.

In one embodiment, the rubber composition comprises from 0.5 to 5 phr of the self-condensing resin. In another embodiment, the rubber composition comprises from 1 to 3 phr of the self condensing resin.

The rubber composition is substantially free of methylene acceptors that may react with the self condensing resin. The term "methylene acceptor" is known to those skilled in the art and is used to describe the reactant to which methylene donors such as hexakis-(methoxymethyl)melamine, N,N', N''-trimethyl/N,N',N''-trimethylolmelamine, hexamethylolmelamine, N,N',N''-dimethylolmelamine, N-methylolmelamine, N,N'-dimethylolmelamine, N,N',N''-tris(methoxymethyl)melamine, N,N'N''-tributyl-N,N',N''-trimethylol-melamine, hexamethoxymethylmelamine, and hexaethoxymethylmelamine react to form what is believed to be a methylol monomer. The condensation of the methylol monomer by the formation of a methylene bridge produces a resin. The initial reaction that contributes the moiety that later forms into the methylene bridge is the methylene donor wherein the other reactant is the methylene acceptor. Representative excluded compounds which may be recognized as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof. Examples of excluded methylene acceptors include but are not limited to those disclosed in U.S. Pat. Nos. 6,605,670; 6,541,551; 6,472,457; 5,945,500; 5,936,056; 5,688,871; 5,665,799; 5,504,127; 5,405,897; 5,244,725; 5,206,289; 5,194,513; 5,030,692; 4,889,481; 4,605,696; 4,436,853; and U.S. Pat. No. 4,092,455. Examples of modified phenol novolak resins include but are not limited to cashew nut oil modified phenol novolak resin, tall oil modified phenol novolak resin and alkyl modified phenol novolak resin. Other examples of excluded methylene acceptors include activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

By substantially free of methylene acceptors, it is meant that no methylene acceptors are intentionally added to the rubber composition, but it is recognized that certain de minimum amounts of such compounds may be present as impurities in rubber and rubber additives or as residue in rubber mixing equipment. In one embodiment, the rubber composition comprises less than 0.1 phr of methylene acceptors The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

In one embodiment, the rubber composition comprises from about 60 to about 120 phr of silica. In another embodiment, the rubber composition comprises from about 80 to about 100 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from 1 to 30 phr of additional fillers selected from carbon black, crosslinked particulate polymer gel, ultra high molecular weight polyethylene (UHMWPE) or plasticized starch.

Commonly employed carbon blacks can be used as a conventional filler. Representative examples of such carbon blacks include N 110, N121, N134, N220, N231, N234, N242, N293, N299, N315, N326, N330, N332, N339, N343, N347, N351, N375, N539, N550, N582, N630, N642, N650, N683, N754, N762, N765, N774, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition comprises a conventional sulfur containing organosilicon compound or a mercapto based organosilicon compound. Examples of suitable conventional sulfur containing organosilicon compounds are of the formula:

$$Z\text{-Alk-}S_n\text{-Alk-}Z \qquad \text{II}$$

in which Z is selected from the group consisting of

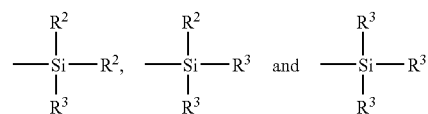

where $R^2$ is an alkyl group of 1 to 4 carbon atoms, cyclohexyl or phenyl; $R^3$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula II, Z may be

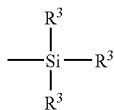

where $R^3$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

EXAMPLE 1

In this example, the effect of adding a self-condensing resin to a silica reinforced rubber composition is illustrated. Rubber compositions containing diene based elastomer, fillers, process aids, antidegradants, and curatives were prepared following recipes as shown in Table 1. Sample 1 was a control, and Sample 2 was identical in composition to sample 1 except for the addition of 1.5 phr of self-condensing resin.

The samples were tested for viscoelastic properties using RPA. "RPA" refers to a Rubber Process Analyzer as RPA 2000™ instrument by Alpha Technologies, formerly the Flexsys Company and formerly the Monsanto Company. References to an RPA 2000 instrument may be found in the following publications: H. A. Palowski, et al, *Rubber World*, June 1992 and January 1997, as well as *Rubber & Plastics News*, Apr. 26 and May 10, 1993.

The "RPA" test results in Table 2 are reported as being from data obtained at 100° C. in a dynamic shear mode at a frequency of 1.6 hertz and at the reported dynamic strain values. Tensile and hardness properties were also measured and reported in Table 2.

TABLE 1

| | control | invention |
|---|---|---|
| | Sample No. | |
| | 1 | 2 |
| Non Productive Mix Step | | |
| Styrene-Butadiene Rubber[1] | 68.78 | 68.78 |
| Polybutadiene[2] | 50 | 50 |
| Silica[3] | 83 | 83 |
| Polysulfidic silane[4] (active content) | 6.64 | 6.64 |
| Process Oil | 4.84 | 4.84 |
| Wax[5] | 1.5 | 1.5 |
| 6-PPD | 2.25 | 2.25 |
| Self condensing resin[6], phr | 0 | 1.5 |
| Productive Mix Step | | |
| Sulfur | 2 | 2 |
| Accelerator[7] | 1.6 | 1.6 |
| Accelerator[8] | 1.8 | 1.8 |
| Zinc Oxide | 2.5 | 2.5 |
| Stearic Acid | 3 | 3 |

[1]Emulsion Styrene Butadiene Rubber with 37.5 phr distillate aromatic extract oil with 31.5% styrene and a Mooney of 50
[2]Nickel cis-BR Budene 1207 from Goodyear
[3]High Dispersion silica Zeosil 1165MP from Rhodia
[4]Bis(triethoxysilylpropyl) disulfide 50 wt % on CB carrier
[5]Paraffinic and microcrystalline
[6]Cyrez ® CRA-132S
[7]Sulfenamide Type
[8]Guanidine type

TABLE 2

| | Sample No. | |
|---|---|---|
| | 1 | 2 |
| Self condensing resin[1], phr | 0 | 1.5 |
| RPA, 100° C., 1.6 Hz | | |
| G', 1% strain (MPa) | 2.35 | 2.8 |
| G', 10% strain (MPa) | 1.62 | 1.78 |
| G', 50% strain (MPa) | 0.87 | 0.93 |
| tan delta, 10% strain | 0.15 | 0.15 |
| Shore A Hardness 23° C. | 65 | 68 |
| Zwick Rebound, 100° C. | 57 | 59 |
| Ring Modulus, 23° C. | | |
| Elongations at break, % | 580 | 490 |
| Modulus 100%, MPa | 1.7 | 2.1 |
| Modulus 300%, MPa | 7.9 | 10.4 |
| Tensile Strength, MPa | 19.1 | 18.8 |
| DIN Abrasion | | |
| Volume Loss (mm³) | 42 | 43 |

As seen in Table 2, the addition of the self-condensing resin results in a unique set of properties with increased hardness, improved resilience and increased high strain modulus. Without wishing to be bound by any theory, it is believed that the self-condensing resin is able to undergo hydrogen bonding interaction with the silanol groups of the silica, and through its aminic moieties it can in addition catalyze the silane condensation on the silica surfaces, leading to surprising and unexpectedly better properties as illustrated in Table 2.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a ground contacting tread, the ground contacting tread comprising a rubber composition, the rubber composition comprising a diene based elastomer, from 60 to 120 parts by weight per 100 parts by weight of elastomer (phr) of silica, from 1 to 10 phr of a sulfur-containing organosilicon compound, and from 1 to 5 phr of a self condensing resin derived from monomers of formula I

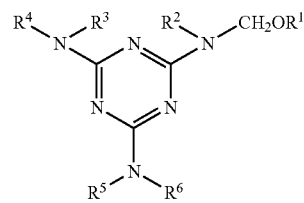

wherein R1 is an alkyl group having 1 to 12 carbon atoms, and each of $R^2$ to $R^6$ is independently selected from the group consisting of hydrogen, —CH$_2$OH, and —CH$_2$OR$^1$ wherein $R^1$ is as previously described; provided that at least one of $R^2$ to $R^6$ is hydrogen, and at least one of $R^2$ to $R^6$ is —CH$_2$OH.

2. The pneumatic tire of claim 1, wherein $R^1$ is methyl.

3. The pneumatic tire of claim 1, wherein at least one of the combinations ($R^3$ and $R^4$) or ($R^5$ and $R^6$) are both hydrogen.

4. The pneumatic tire of claim 1, wherein the sulfur containing organosilicon compound comprises a compound of the formula:

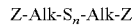

in which Z is selected from the group consisting of

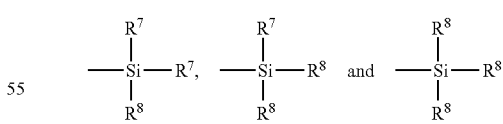

where $R^7$ is an alkyl group of 1 to 4 carbon atoms, cyclohexyl or phenyl; $R^8$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

5. The pneumatic tire of claim 1, wherein the sulfur containing organosilicon compound comprises 3,3'-bis(triethoxysilylpropyl) disulfide.

* * * * *